(12) United States Patent
Chun et al.

(10) Patent No.: US 9,356,662 B2
(45) Date of Patent: May 31, 2016

(54) METHOD AND APPARATUS FOR TRANSMITTING FEEDBACK INFORMATION OF A TERMINAL IN A MULTI-NODE SYSTEM

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 13/640,435

(22) PCT Filed: Apr. 7, 2011

(86) PCT No.: PCT/KR2011/002444
§ 371 (c)(1),
(2), (4) Date: Oct. 10, 2012

(87) PCT Pub. No.: WO2011/129547
PCT Pub. Date: Oct. 20, 2011

(65) Prior Publication Data
US 2013/0028129 A1    Jan. 31, 2013

Related U.S. Application Data

(60) Provisional application No. 61/322,917, filed on Apr. 12, 2010.

(51) Int. Cl.
*H04B 7/02*  (2006.01)
*H04B 7/06*  (2006.01)

(52) U.S. Cl.
CPC .............. *H04B 7/024* (2013.01); *H04B 7/0632* (2013.01); *H04B 7/0639* (2013.01); *H04B 7/0684* (2013.01)

(58) Field of Classification Search
None
See application file for complete search history.

(56) References Cited

U.S. PATENT DOCUMENTS

| | | | |
|---|---|---|---|
| 8,599,947 B2 * | 12/2013 | Chun et al. ................... 375/267 |
| 2007/0258357 A1 * | 11/2007 | Akita ............................ 370/208 |
| 2007/0293233 A1 * | 12/2007 | Inoue et al. ................... 455/450 |
| 2008/0032633 A1 * | 2/2008 | Harrison ............... H04B 7/0632 455/69 |
| 2009/0238573 A1 | 9/2009 | Bauman |
| 2009/0239474 A1 * | 9/2009 | Kangas et al. .............. 455/67.13 |
| 2009/0262694 A1 * | 10/2009 | Lee et al. ....................... 370/329 |
| 2010/0034146 A1 | 2/2010 | Hou et al. |
| 2010/0056171 A1 | 3/2010 | Ramprashad et al. |
| 2010/0069122 A1 | 3/2010 | Ito |
| 2010/0074183 A1 * | 3/2010 | Chen et al. .................... 370/328 |
| 2010/0183086 A1 * | 7/2010 | Ko ........................ H04B 7/0413 375/260 |
| 2010/0296591 A1 * | 11/2010 | Xu et al. ........................ 375/259 |
| 2012/0213113 A1 * | 8/2012 | Zhao et al. .................... 370/252 |

FOREIGN PATENT DOCUMENTS

KR   10-2000-0046182 A        7/2000
KR   WO2009/002087 A1 *    12/2008   ............... H04B 7/06

* cited by examiner

*Primary Examiner* — Jeffrey M Rutkowski
*Assistant Examiner* — Ning Li
(74) *Attorney, Agent, or Firm* — Dentons US LLP (57) ABSTRACT

Provided are a method and apparatus for transmitting feedback information of a terminal in a multi-node system in which a plurality of antennas are distributed and disposed in a cell. The method comprises the steps of: transmitting first feedback information, indicating a state between a channel and at least one of antennas, to a base station; and transmitting second feedback information, indicating at least one antenna, to the base station.

5 Claims, 12 Drawing Sheets

● Subband index
■ Number of antennas
▲ Antenna classification information

METHOD AND APPARATUS FOR TRANSMITTING FEEDBACK INFORMATION OF A TERMINAL IN A MULTI-NODE SYSTEM

TECHNICAL FIELD

The present invention relates to wireless communication and, more specifically, to a method of transmitting feedback information which is performed by a terminal in a multi-node system, such as a multi-tier network or a distributed antenna system, and a terminal using the method.

BACKGROUND ART

In a current wireless communication environment, the amount of data necessary for a communication network is rapidly increasing due to Machine-to-Machine (M2M) communication and the appearance and spread of a variety of devices, such as smart phones and tablet PCs which require a large amount of transmission data. In order to satisfy a large amount of transmission data, communication technology is being developed into carrier aggregation technology for efficiently using a greater frequency band, cognitive radio technology, multi-antenna technology for increasing the capacity of data within a limited frequency, multi-base station cooperation technology, and so on.

Furthermore, a wireless communication environment is evolving into an increase in the density of nodes which may access user peripheries. Here, the nodes refer to antennas or a group of antennas which are spaced apart from one another at specific intervals or higher in a Distributed Antenna System (DAS). In the present invention, however, the nodes are not limited to the above meaning, but may be used in a broad sense. The node may be a base station, a picocell base station (PeNB), a home base station (HeNB), a Remote Radio Head (RRH), a Remote Radio Unit (RRU), a relay station, a distributed antenna, or the like. A wireless communication system having a high density of nodes may show higher system performance through cooperation between the nodes. That is, each node operates as an independent Base Station (BS) (or Advanced BS (ABS), Node-B (NB), eNode-B (eNB), or Access Point (AP), etc.) and thus has much excellent system performance as compared with the case when they do not cooperate with each other.

Figure 1:
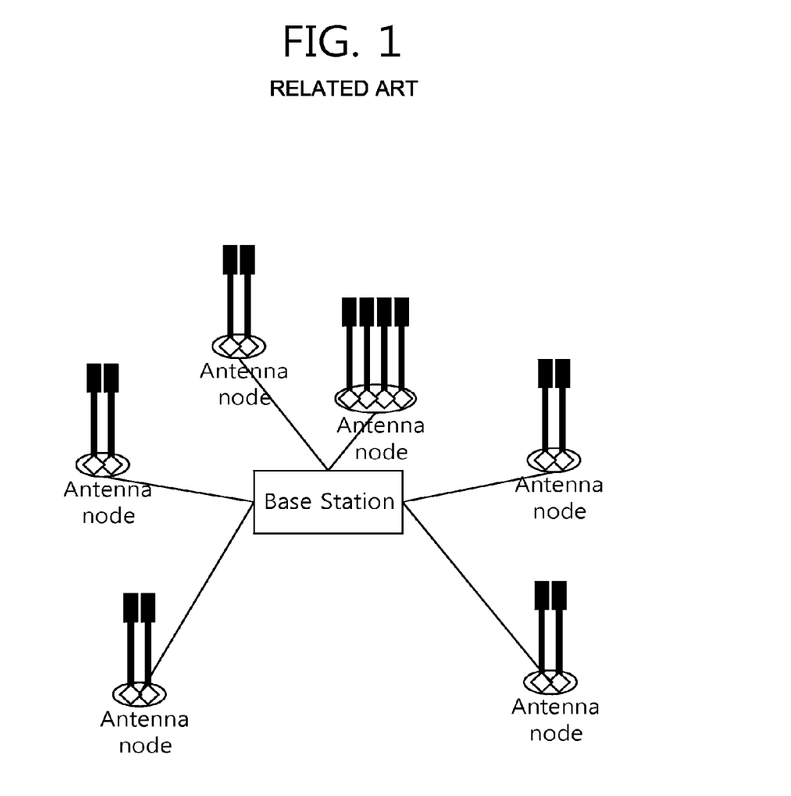
FIG. 1 shows an example of a multi-node system.

FIG. 1 shows an example of a multi-node system.

Referring to FIG. 1, the multi-node system includes a plurality of nodes. In FIG. 1, a node indicated by an antenna node may be a BS, a picocell BS (PeNB), a hone BS (HeNB), a Remote Radio Head (RRH), a relay station, or a distributed antenna. This node is also called a point.

In a multi-node system, if the transmission and reception of all nodes are managed by one BS controller and thus an individual node operates as part of one cell, this system may be called a Distributed Antenna System (DAS) that forms one cell. In a DAS, all nodes may be given respective node IDs, and they may operate as a set of some antennas within a cell without separate node IDs. In other words, a Distributed Antenna System (DAS) means a system in which antennas are distributed over and disposed at various positions within a cell and the antennas are managed by a BS. A DAS differs from a conventional Centralized Antenna System (CAS) in that the antennas of a BS are concentrated on the center of a cell and disposed.

In a multi-node system, if an individual node has an individual cell ID and performs scheduling and handover, this system may be considered as a multi-cell (e.g., macrocell/femtocell/picocell) system. If multi-cells are configured in such a way as to overlap with each other according to coverage, this is called a multi-tier network.

In a multi-node system, such as a distributed antenna system or a multi-tier network, nodes that transmit signals to respective terminals may be different, and nodes that receive signals from terminals may be different. Accordingly, if a terminal feeds back information on a channel state using a method as in a CAS, there is a problem in that a BS does not know that the information is feedback information on what node.

There is a need for a method and apparatus for transmitting feedback information of a terminal in a multi-node system.

DISCLOSURE

Technical Problem

There is provided a method of a terminal transmitting feedback information in a multi-node system, such as a distributed antenna system or a multi-tier network, and an apparatus using the method.

Technical Solution

A method of an MS transmitting feedback information in accordance with an aspect of the present invention includes the steps of transmitting first feedback information indicative of a state for a channel with at least one of the plurality of antennas to the base station; and transmitting second feedback information indicative of the at least one antenna to the base station.

The first feedback information may include a subband index indicating the index of a subband selected from a plurality of subbands allocated to the mobile station.

The first feedback information may further include at least one of information on a rank preferred by the mobile station in relation to the selected subband, Channel Quality Information (CQI) on the selected subband, and a Precoding Matrix index (PMI) for the subband.

The second feedback information may include at least one of information on the number of the at least one antenna and antenna classification information on which the at least one antenna can be identified.

The first feedback information may be transmitted through a first period, and the second feedback information may be transmitted through a second period.

The first period and the second period may be identical with each other, and the first feedback information and the second feedback information may be transmitted simultaneously.

The first period and the second period may be different from each other.

The first period may be longer than the second period or the second period may be longer than the first period.

The method may further include the step of the mobile station receiving classification information on an antenna on which the first feedback information is to be transmitted from the base station.

Each of the plurality of antennas may send a predetermined reference signal, and the mobile station may measure the reference signals and distinguish the plurality of antennas from one another based on a result of the measurement.

Each of the plurality of antennas may send unique identification information, and the mobile station may distinguish the plurality of antennas from one another through the unique identification information.

The second feedback information may be for each of subbands selected by the mobile station, from among the plurality of subbands allocated to the mobile station.

The second feedback information may be for a frequency band formed of all subbands selected by the mobile station, from among the plurality of subbands allocated to the mobile station.

An apparatus for transmitting feedback information in accordance with another aspect of the present invention operates in a multi-node system in which a plurality of antennas is distributed over and disposed in a cell and a base station for controlling the plurality of antennas is included and includes a Radio Frequency (RF) unit configured to transmit and receive radio signals and the processor connected to the RF unit, wherein The processor transmits first feedback information indicative of a state for a channel with at least one of the plurality of antennas to the base station and transmits second feedback information indicative of the at least one antenna to the base station.

Advantageous Effects

In accordance with the present invention, there is provided a feedback method for operating a multi-node system. For example, an MS transmits information on preferred antennas of a plurality of antennas distributed over and disposed in a cell in a distributed antenna system, together with basic feedback information, such as a subband index. Accordingly, the antenna scheduling of a BS can be efficiently performed.

MODE FOR INVENTION

The following technology may be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). The CDMA may be implemented using radio technology, such as Universal Terrestrial Radio Access (UTRA) or CDMA2000. The TDMA may be implemented using radio technology, such as Global System for Mobile communications (GSM)/General Packet Radio Service (GPRS)/Enhanced Data Rates for GSM Evolution (EDGE). The OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). The UTRA is part of a Universal Mobile Telecommunications System (UMTS). $3^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advance (LTE-A) is an evolution of LTE. IEEE 802.16m is an evolution of IEEE 802.16e.

Figure 2:
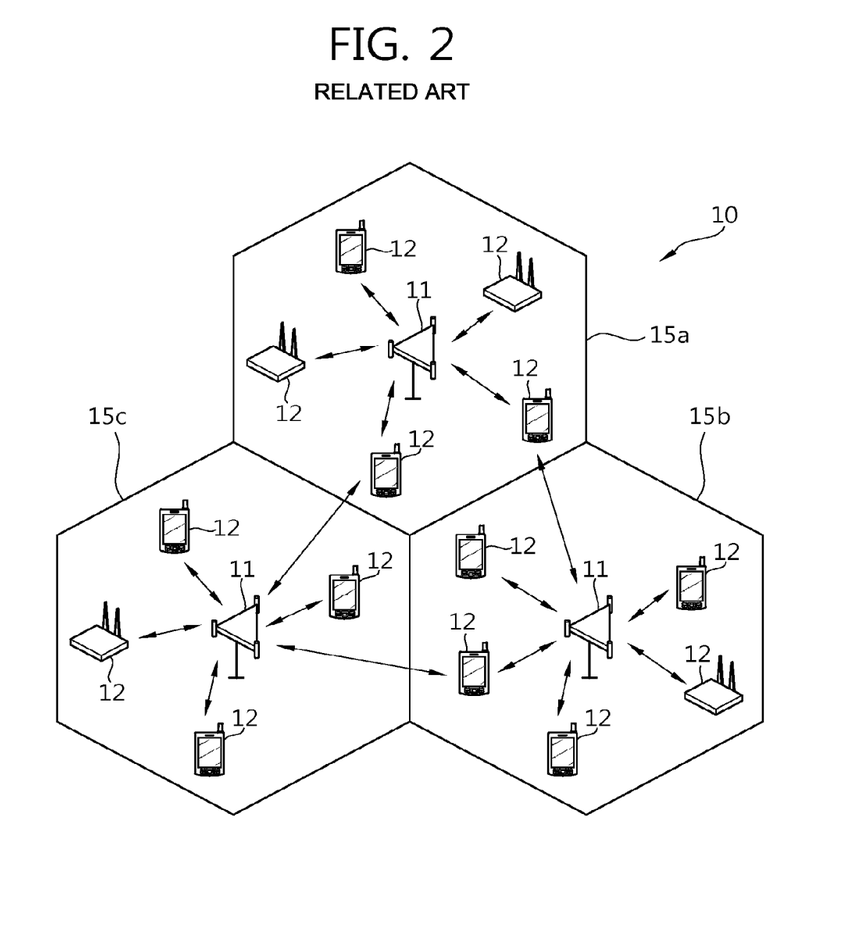
FIG. 2 is a block diagram illustrating a wireless communication system.

FIG. 2 is a block diagram illustrating a wireless communication system.

Referring to FIG. 2, the wireless communication system 10 includes one or more Base Stations (BS) 11. The BSs 11 provide communication services to specific geographical areas (typically called cells) 15a, 15b, and 15c. The cell may be classified into a plurality of areas (called sectors). A Mobile Stations (MS) 12 may be fixed or mobile and may also be called another terminology, such as User Equipment (UE), a User Terminal (UT), a Subscriber Station (SS), a wireless device, a Personal Digital Assistant (PDA), a wireless modem, or a handheld device. The BS 11 refers to a fixed station that communicates with the MSs 12, and it may also be called another terminology, such as an evolved Node (eNB), a Base Transceiver System (BTS), or an access point.

Hereinafter, downlink (DL) refers to a communication link from a BS to an MS, and uplink (UL) refers to a communication link from an MS to a BS. In downlink, a transmitter may be part of a BS and a receiver may be part of an MS. In uplink, a transmitter may be part of an MS and a receiver may be part of a BS.

A wireless communication system may support multiple antennas. That is, a transmitter may use a plurality of transmit antennas, and a receiver may use a plurality of receive antennas. The transmit antenna refers to a physical or logical antenna that is used to transmit one signal or stream. The receive antenna refers to a physical or logical antenna that is used to receive one signal or stream. If a transmitter and a receiver use a plurality of antennas, a wireless communication system may be called a Multiple Input Multiple Output (MIMO) system.

A variety of transmission schemes may be used in an MIMO system. The transmission scheme refers to a scheme in which a BS transmits downlink data to an MS. A MIMO transmission scheme includes transmit diversity, spatial multiplexing, beamforming, and so on. Transmit diversity is technology in which multiple transmit antennas transmit the same data in order to improve transmission reliability. Spatial multiplexing is technology in which multiple transmit antennas transmit different data at the same time in order to transmit data at a high speed without increasing the bandwidth of a system. Beamforming is used to increase a Signal to Interference plus Noise Ratio (SINR) of a signal by adding a weight according to a channel state in multiple antennas. Here, the weight may be expressed by a weight vector or a weight matrix, which is called a precoding vector or a precoding matrix.

Spatial multiplexing includes spatial multiplexing for a single user and spatial multiplexing for multiple users. The spatial multiplexing for a single user is also called Single User MIMO (SU-MIMO), and the spatial multiplexing for multiple users is also called Spatial Division Multiple Access (SDMA) or Multi-User MIMO (MU-MIMO).

A MIMO transmission scheme may be semi-statically configured by a higher layer signal, such as Radio Resource Control (RRC).

A wireless communication system to which the present invention is applied may be a multi-node system, such as a distributed antenna system or a multi-tier network. Here, the distributed antenna system differs from a femtocell/picocell in which an individual antenna forms an individual network in that each node, that is, an individual antenna, does not control the area of the antenna, but a central BS controls the entire antenna area. A distributed antenna system is also different from a relay station or an ad-hoc system in that antennas can be coupled by a wired line. Furthermore, in a distributed antenna system, antennas are also different from simple repeaters in that they can transmit different signals in response to a command from a BS.

An initial distributed antenna system was used to repeatedly transmit a signal by further installing antennas within a cell in order to cover a shadow area. That is, a major object of an initial distributed antenna system is to secure coverage. From a macroscopic point of view, a distributed antenna system may be considered as a kind of Multiple Input Multiple Output (MIMO) system in that antennas can support a single user or several users by transmitting or receiving a plurality of data streams at the same time. A MIMO system is recognized as a system which may satisfy the next-generation communication requirements due to high spectral efficiency. From a viewpoint of a MIMO system, a DAS has more advantages than a CAS. For example, there are advantages in that power efficiency is high because the distance between a user and an antenna is reduced, a channel capacity is high due to a correlation and interference between low antennas, and communication of relatively uniform quality is secured irrespective of the position of a user within a cell.

If an individual node has an individual cell ID and performs scheduling and handover, this may be considered as a multi-cell (e.g., a macrocell/femtocell/picocell) system. If the multiple cells are configured in such a way as to overlap with one another according to coverage, this is called a multi-tier network. A macrocell commonly refers to a large-scale BS that is installed by a communication service provider. A femtocell is a low-power radio access point and is an ultra-small BS for mobile communication that is used in a room, for example, a home or an office. A femtocell may access a mobile communication core network using the DSL or cable broadband of a home or an office. A picocell is a low-power radio access point and is different from a femtocell in that it may include a BS of a macrocell and an X2 interface. Dynamic signaling may be performed between a picocell BS and a macrocell BS.

The present invention can also be applied to the above-described multi-tier network.

The above-described multi-node system needs to perform MIMO transmission in order to secure a high data capacity that is necessary for the present and future communication standards. For example, it may be necessary to perform transmission of rank 2 or higher to User Equipment (UE) in the same frequency domain (this is called Single User MIMO (SU-MIMO) transmission). Or, it may necessary to perform Multi-User MIMO (MU-MIMO) transmission that supports several MSs at the same time. This may also be required even in uplink as well as downlink.

The above-described SU-MIMO and MU-MIMO communications are indispensable taken into consideration in IEEE 802 and 3GPP LTE, that is, standardization organizations, and are actually handled in standards, such as Institute of Electrical and Electronics Engineers (IEEE) 802.16e/m, and $3^{rd}$ generation partnership project (3GPP) Long Term Evolution (LTE) releases 8/9. However, it is difficult to apply current communication standards to multi-node systems to which advanced technology, such as MIMO technology, has been applied without change because the current communication standards are designed based on a CAS. Accordingly, there is a need for a communication standard that supports a multi-node system, and there is a need for a method of an MS transmitting feedback information that may be provided to this communication standard and an MS that operates in accordance with the method. A distributed antenna system is hereinafter described as a multi-node system as an example, but the present invention is not limited thereto and may also be applied to a multi-tier network.

Figure 3:
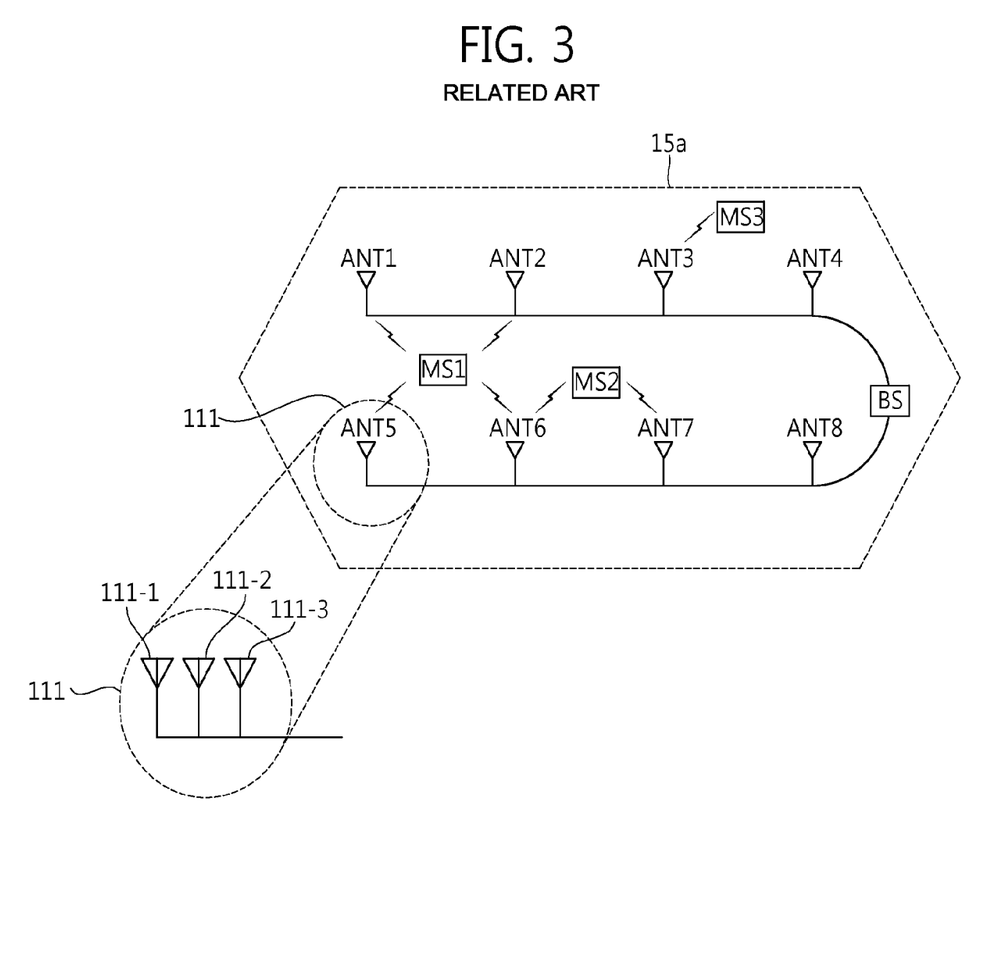
FIG. 3 illustrates a distributed antenna system.

FIG. 3 illustrates a distributed antenna system.

Referring to FIG. 3, the Distributed Antenna System (DAS) includes a Base Station (BS) and a plurality of BS antennas (e.g., ANT1 to ANT8, the BS antenna is hereinafter abbreviated to the antenna). The antennas ANT1 to ANT8 may be coupled to the BS by a wired line. In the distributed antenna system, unlike in a conventional Centralized Antennal System (CAS), the antennas are not gathered at a specific point of a cell 15a, for example, at the center of the cell, but are distributed over various positions within the cell. Here, as shown in FIG. 2, the antennas may be placed in respective places which are spaced apart from one another within a cell (the antenna 1 to the antenna 4, the antenna 6 to the antenna 8) and may be distributed so that several antennas 111-1, 111-2, and 111-3 may be closely concentrated as in the antenna 5 111. The closely concentrated antennas may form one antenna node.

The antennas may be distributed so that their antenna coverages overlap with one another and transmission of rank 2 or higher is possible. That is, the antenna coverage of each antenna may reach up to a neighbor at least one antenna. In this case, the intensities of signals received from a plurality of antennas in MSs that are placed within the cell may be changed in various ways depending on a position within the cell and a channel state.

Referring to the example of FIG. 3, an MS 1 can receive signals having good reception sensitivity from the antennas 1, 2, 5, and 6. In contrast, the influence of signals transmitted by the antennas 3, 4, 7, and 8 may be insignificant to the MS 1 due to a path loss. An MS 2 can receive signals having good reception sensitivity from the antennas 6 and 7, but the influence of signals transmitted by the remaining antennas on the MS 2 may be insignificant. Likewise, an MS 3 can receive a signal having good reception sensitivity from the antenna 3 only, and the intensity of signals from the remaining antennas may be weak to the extent that the signals may be insignificant.

As described in the above example, in a distributed antenna system, to provide communication service using a plurality of different antennas to a plurality of MSs which are spaced apart from one another within a cell may be easy. That is, in the above example, communication may be performed on the MS 1 using the antennas 1, 2, 5, and 6, communication may be performed on the MS 2 using the antenna 7, and communication may be performed on the MS 3 using the antenna 3. The antennas 4 and 8 may transmit signals for the MS 2 or the MS 3 and may not transmit any signal. That is, the antennas 4 and 8 may be operated in an off state according to circumstances. Furthermore, the number of transmission ranks or the number of transmission layers (i.e., the number of transmission streams) for the MS 1, 2, and 3 may be different. For example, if each of the MSs has two receive antennas, transmission of rank 2 may be performed on the MS 1 and transmission of rank 1 may be performed on the MSs 2 and 3.

Hereinafter, an antenna means an antenna node described in a DAS or an individual physical or effective antenna that is included in the antenna node.

As described above, if SU-MIMO/MU-MIMO communications are performed in a distributed antenna system, a variety of transmission layers may exist in each MS, and the number of antennas (or a antenna group) allocated to each MS may be different. In other words, in a distributed antenna system, specific antennas (or a specific antenna group) may be supported for each MS. Antenna supported for an MS may be changed depending on the time and the frequency band.

A method of an MS transmitting feedback information which may be applied to a distributed antenna system is described below by taking the above characteristics into consideration.

Pieces of basic feedback information on a channel state that may be transmitted from an MS to a BS are as follows.

1. Subband Index

A subband means a set of a plurality of subcarriers that neighbor to each other in a frequency band. A plurality of subbands may be allocated to an MS, and the MS may select preferred subbands according to a predetermined measurement method. That is, the MS selects specific bands having a good channel state for the allocated frequency bands and feeds back this information to a BS. For example, a total of N subbands may exist in a system band, and an MS may select M subbands from the N subbands and feed back the indices of the selected M subbands to a BS. Here, each of N and M is a natural number, and N is greater than or equal to M. This subband index may be utilized for a BS to perform frequency selective scheduling.

2. Rank Information

An MS may feed back information on a preferred rank for each allocated subband or for all allocated bands. The rank means the number of independent channels that are formed between the MS and the antennas of a DAS.

3. Codebook Index

An MS may feed back the indices of preferred precoding matrices by taking a channel formed between the MS and the antennas of a DAS. The precoding matrix may be a matrix (or vector) that is selected from a predetermined codebook. The MS may feed back information on a Precoding Matrix Index (PMI) or correlation for each allocated subband or for all allocated subbands. This PMI or correlation information may be used as information for closed-loop MIMO.

4. Channel Quality Information (CQI)

An MS may feed back channel quality information on a channel between the MS and the antennas of a DAS for each allocated subband or for all allocated bands. CQI may be, for example, a physical Carrier to Interference-and-Noise Ratio (CINR) or a logical CINR (e.g., a Modulation and Coding Scheme (MCS) level).

In a DAS, each MS can distinguish antennas from each other. For example, each MS can distinguish antennas from each other based on an antenna classification number, a midamble index, or a pilot index that is transmitted for each antenna. That is, different reference signals may be transmitted for each antenna. If an MS knows this reference signal in advance, the MS can know a signal that is transmitted through what antenna. Or, an MS can distinguish antennas from each other based on an antenna classification number that is uniquely allocated to each antenna.

An MS can recognize antennas within a measurable range, distinguish pieces of basic feedback information on channels with respective antennas from each other, and make a report. An MS may distinguish antennas that can be transmitted and received from each other through channel estimation or may receive information on antennas within a DAS from a BS and distinguish the antennas from each other based on the received information. A BS may provide an MS with only classification information on some of antennas within a DAS.

When feeding back at least one of the pieces of basic feedback information 1 to 4 to a BS, an MS may transmit the basic feedback information along with antenna information, that is, the number of preferred antennas and/or classification information on preferred antennas. For example, an MS may transmit antenna information in a bitmap form. If a BS requires antenna information on antennas that may be classified into N, the BS may inform an MS of the number of preferred antennas and preferred antennas in the form of a bitmap of N bits. That is, in the bitmap of N bits, each bit corresponds to an antenna, '0' may mean a non-preferred antenna, and '1' may mean a preferred antenna. Or, a BS may inform classification information on preferred antennas in relation to the number of M fixed antennas. The number M of fixed antennas may be previously determined, or a BS may determine the number M of fixed antennas at the request of an MS and inform the MS of the number M of fixed antennas.

Figure 4:
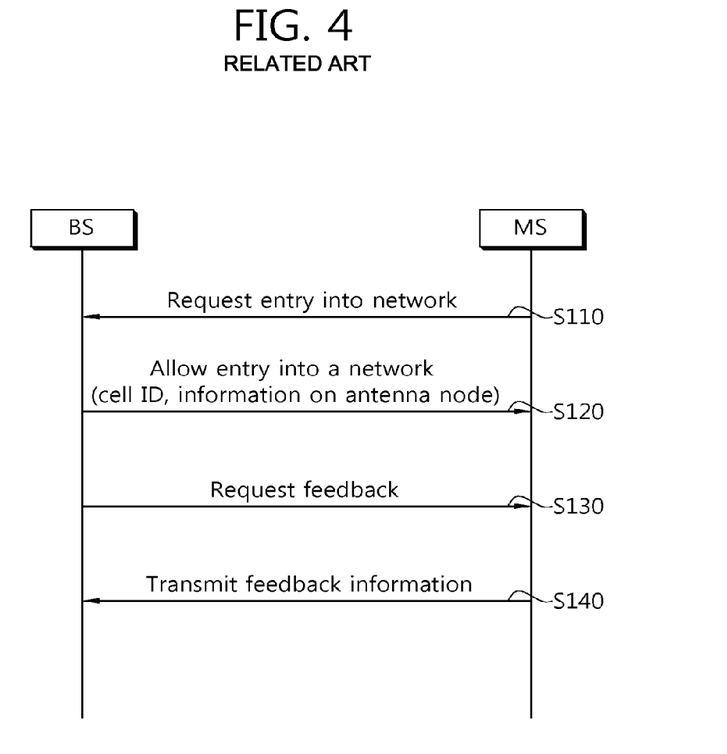
FIG. 4 is a flowchart illustrating a method of transmitting feedback information.

FIG. 4 is a flowchart illustrating a method of transmitting feedback information.

Referring to FIG. 4, an MS requests entry into a network from a BS (S110). The BS transmits network entry permission to the MS (S120). Here, the BS may inform the MS of a cell ID and antenna node information. That is, the BS may transmit ID information on antennas within a cell to the MS.

The BS may request feedback for information on a channel state from the MS (S130). The BS may request a variety of feedbacks depending on a channel characteristic with the MS. The channel characteristic varies depending on a variety of factors, such as the moving speed of the MS, a position within a cell, interference in the frequency domain, and interference in the time domain. The BS may request feedback using a variety of methods from the MS by taking the channel characteristics into account, and the MS may feed back information on the channel state using a variety of methods. A method of an MS performing feedback is described in detail later.

The MS transmits feedback information to the BS (S140). The feedback information may include at least one of the above-described pieces of basic feedback information and antenna information.

A variety of feedback methods of an MS are described below.

Figure 5:
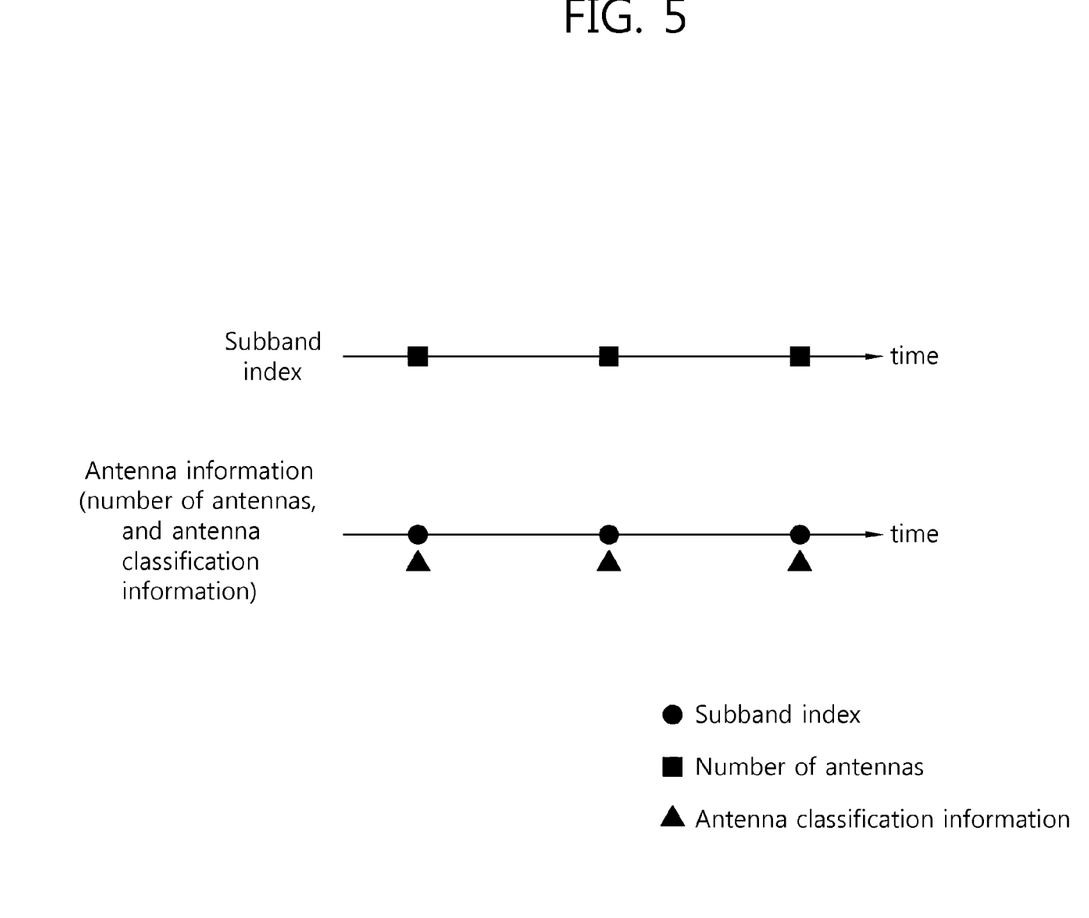
FIG. 5 illustrates a feedback method of an MS in a DAS in accordance with a first embodiment of present invention.

FIG. 5 illustrates a feedback method of an MS in a DAS in accordance with a first embodiment of present invention.

Referring to FIG. 5, the MS may transmit a subband index in a specific period. The MS may transmit the subband index along with antenna information. The antenna information includes the number of antennas preferred by the MS and antenna classification information corresponding to the number of antennas. As described above, the antenna classification information means information on which antennas within a DAS can be distinguished from each other. The antenna information may be given for each subband, corresponding to the index of a subband selected by the MS, or may be given for all subbands selected by the MS.

For example, if an MS selects a subband M and a subband M+N, the MS may feed back the number of preferred antennas and antenna classification information on each of the subband M and the subband M+N. Or, the MS may feed back the number of preferred antennas and antenna classification information on all frequency bands that include the subband M and the subband M+N.

Figure 6:
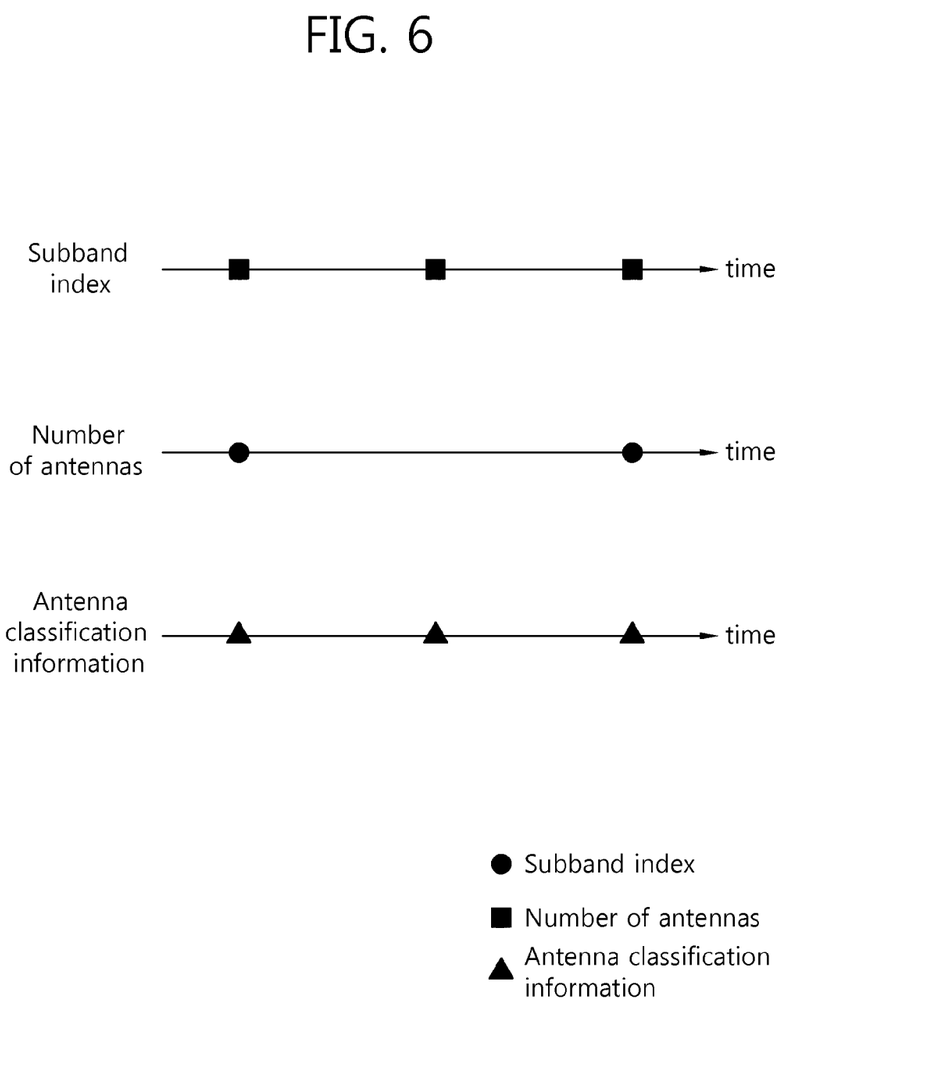
FIG. 6 illustrates a feedback method of an MS in a DAS in accordance with a second embodiment of present invention.

FIG. 6 illustrates a feedback method of an MS in a DAS in accordance with a second embodiment of present invention.

Referring to FIG. 6, the MS may transmit the subband index of a preferred subband in a first period and may transmit the number of antennas for each subband that is indicated by a subband index or the number of antennas for a frequency band that includes all subbands indicated by a subband index in a second period. Here, the second period may be greater than the first period. Furthermore, antenna classification information, together with the subband index, may be transmitted in the first period. This feedback method may be applied to the case where the number of antennas having a good channel state between an MS and antennas is slowly changed, but a corresponding antenna itself is rapidly changed. For example, in terms of the time, if an MS has a good channel state with an antenna 1 and an antenna 2 and then has a good channel state with the antenna 2 and an antenna 3, the number of antennas having a good channel state with the MS is the same, that is, 2, but corresponding antennas are changed. If a channel state changes as described above, a BS may instruct the MS to perform a feedback method according to a second embodiment.

Figure 7:
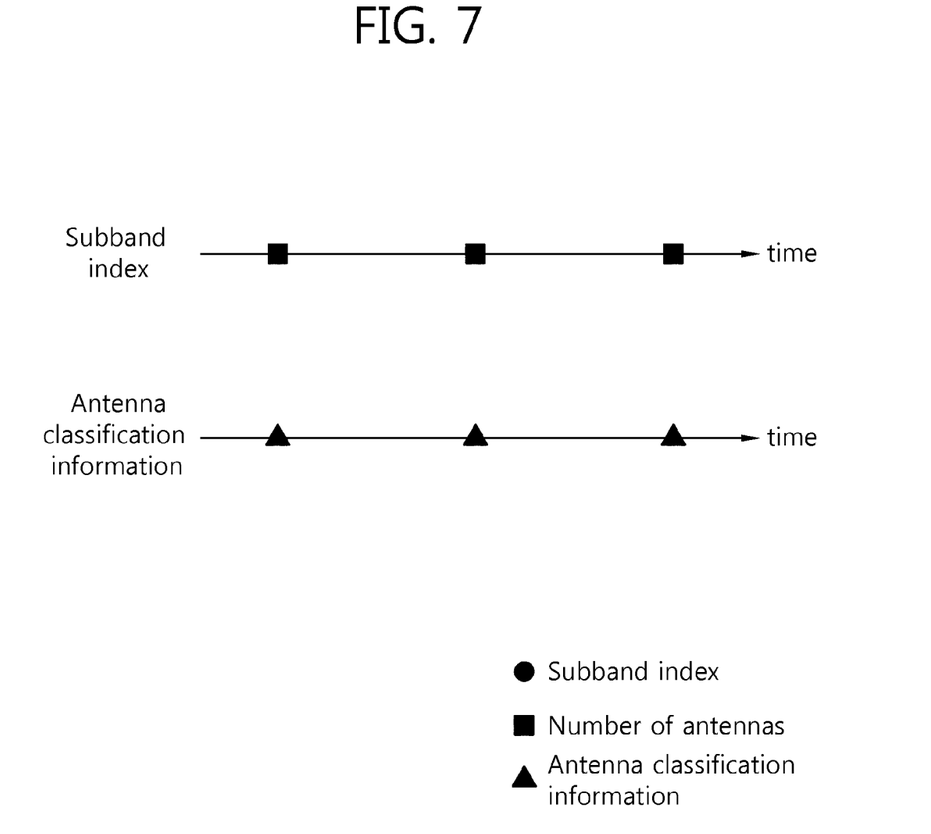
FIG. 7 illustrates a feedback method of an MS in a DAS in accordance with a third embodiment of present invention.

FIG. 7 illustrates a feedback method of an MS in a DAS in accordance with a third embodiment of present invention.

Referring to FIG. 7, the MS may transmit a subband index and antenna classification information to a BS at the same time. Here, the MS may not transmit the number of antennas to the BS. This feedback method may correspond to the case where the BS has previously designated the number of antennas that must be fed back for each subband or the number of antennas that must be fed back for all subband to the MS.

The number of antennas preferred by an MS within a cell may be varied depending on a channel state or the speed of the MS. However, in order for a BS to adaptively support a different number of antenna for each MS within a cell, excessive overhead may occur. Accordingly, a method in which an MS fixes the number of preferred antennas in advance or a period is changed into a period that is permitted from a viewpoint of overhead may be taken into account.

The case where an MS transmits feedback information on a predetermined number (p) of antennas is assumed below. That is, a BS may set the number of preferred antennas from among antennas for an MS.

Figure 8:
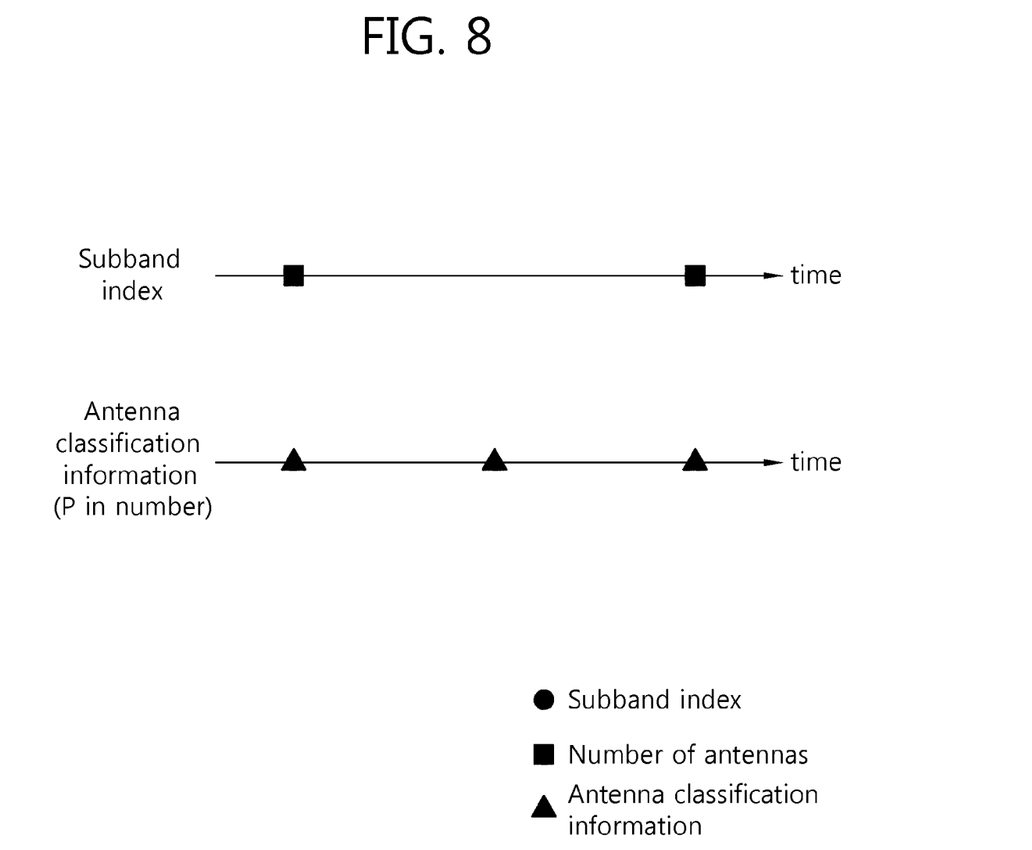
FIG. 8 illustrates a feedback method of an MS in a DAS in accordance with a fourth embodiment of present invention.

FIG. 8 illustrates a feedback method of an MS in a DAS in accordance with a fourth embodiment of present invention.

Referring to FIG. 8, the MS transmits a subband index with a first period. The MS transmits antenna classification information on p antennas with a second period. Here, the first period may be greater than or equal to the second period.

If the number of antennas that may be recognized by the MS through channel measurement is q and q is smaller than the p, the MS transmits antenna classification information on the q antennas and transmits the remainder, that is, a value of p−q, as a specific value (e.g., '0') that may indicate null.

If the number p of antennas that may be recognized by the MS is greater than the p, the M selects the p antennas for each subband or for all subbands and transmits antenna classification information.

This feedback method may be suitable for a channel condition that a channel state is slowly changed in the frequency domain, but an antenna preferred by an MS is rapidly changed.

Figure 9:
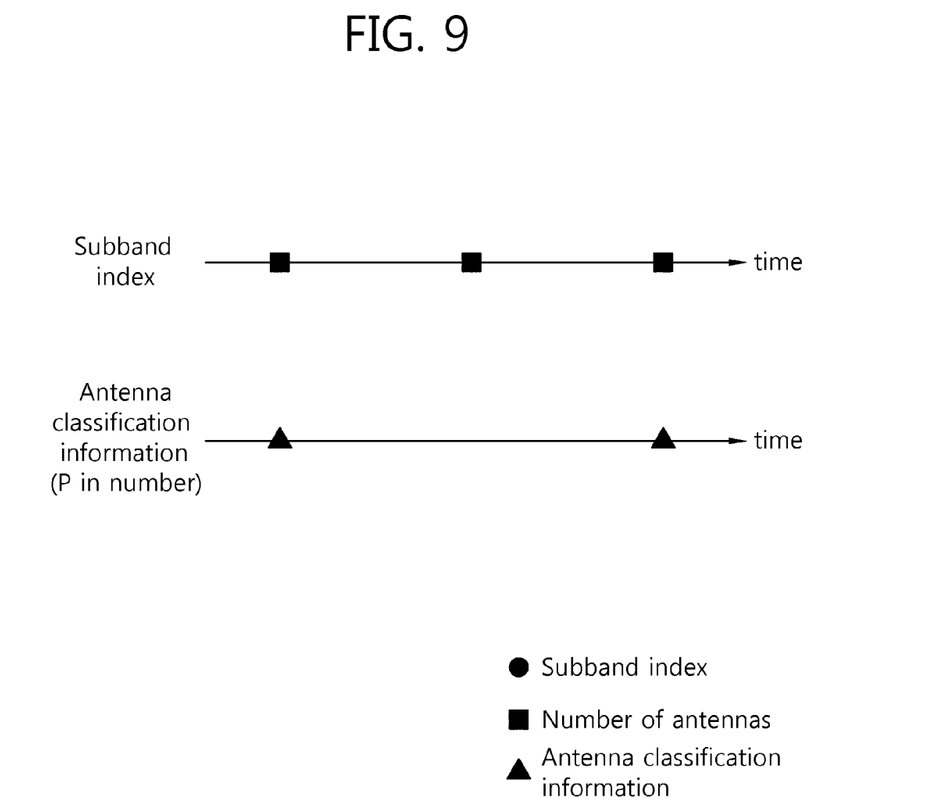
FIG. 9 illustrates a feedback method of an MS in a DAS in accordance with a fifth embodiment of present invention.

FIG. 9 illustrates a feedback method of an MS in a DAS in accordance with a fifth embodiment of present invention.

Referring to FIG. 9, the MS transmits a subband index in a first period. Furthermore, the MS transmits classification information on p antennas for each subband, indicated by each subband index, or for all subbands. A difference between FIG. 9 and FIG. 7 is that a period in which the antenna classification information is transmitted is longer than a period in which the subband index is transmitted. This feedback method may be suitable for a channel condition that a channel state is suddenly changed in the frequency domain, but a change of an antenna preferred by an MS is relatively small.

Figure 10:
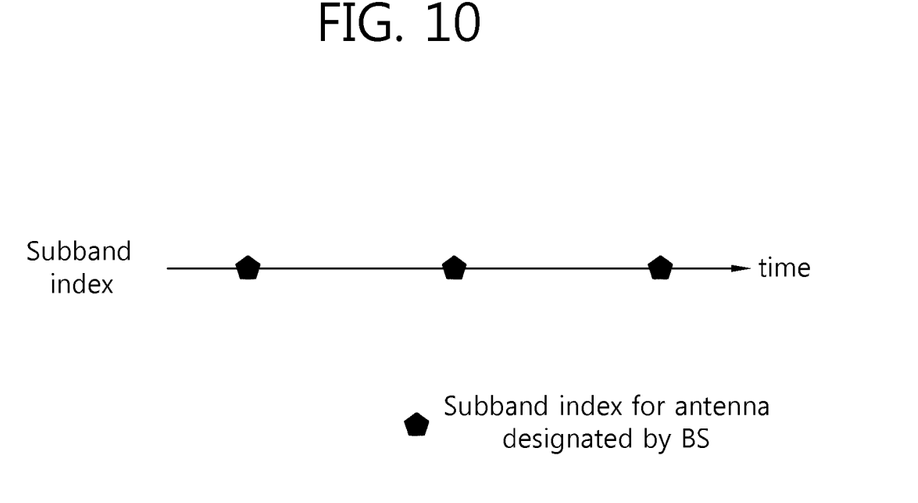
FIG. 10 illustrates a feedback method of an MS in a DAS in accordance with a sixth embodiment of present invention.

FIG. 10 illustrates a feedback method of an MS in a DAS in accordance with a sixth embodiment of present invention.

Referring to FIG. 10, the MS transmits only a subband index. The MS may receive classification information on antennas that will be transmitted and received from a BS in advance. The BS may inform the MS of antenna classification information on the antennas to be transmitted and received for each subband or for all allocated bands. That is, the BS may instruct the MS to feed back only a subband index for a specific antenna. In this case, the MS does not need to transmit antenna classification information and may transmit only a subband index.

In FIGS. 5 to 10, a subband index has been described as an example of the basic feedback information, but this is not a limit. That is, the basic feedback information may include CQI, PMI, RI, etc. in addition to the subband index.

Figure 11:
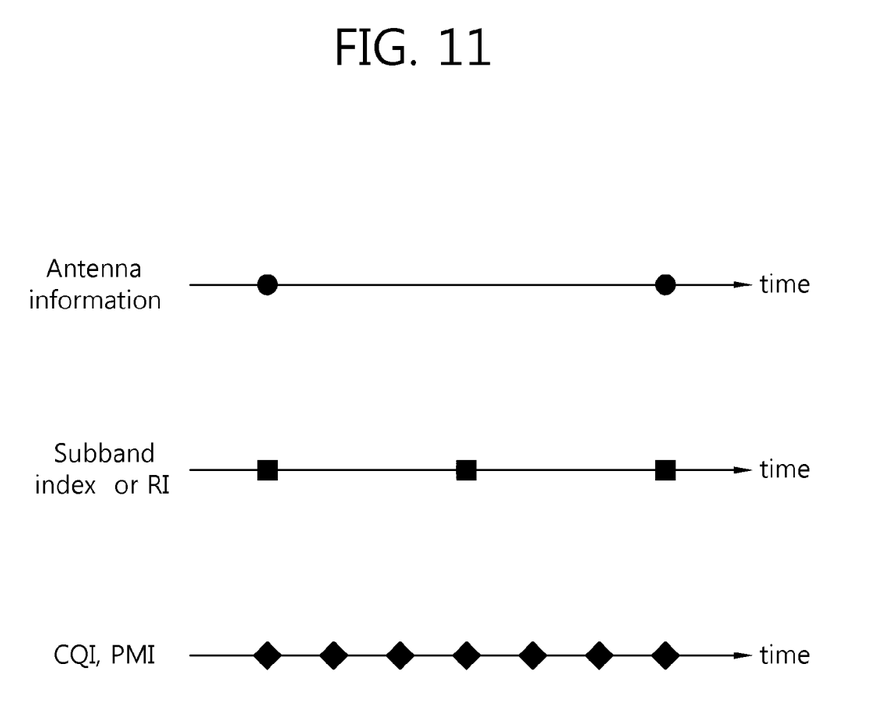
FIG. 11 is an example in which periods that may be selected depending on the type of feedback information transmitted by an MS are compared with each other.

FIG. 11 is an example in which periods that may be selected depending on the type of feedback information transmitted by an MS are compared with each other.

Referring to FIG. 11, the MS may transmit antenna information in a first period and transmit a subband index or RI in a second period. CQI and PMI may be transmitted in a third period. In general, the first period is the greatest, and the size of the periods may be set in order of the second period and the third period. That is, there is a high probability that antenna information is not frequently changed, and an increase in a computation load according to a change of antennas is great, so that the antenna information is transmitted in the longest period.

Figure 12:
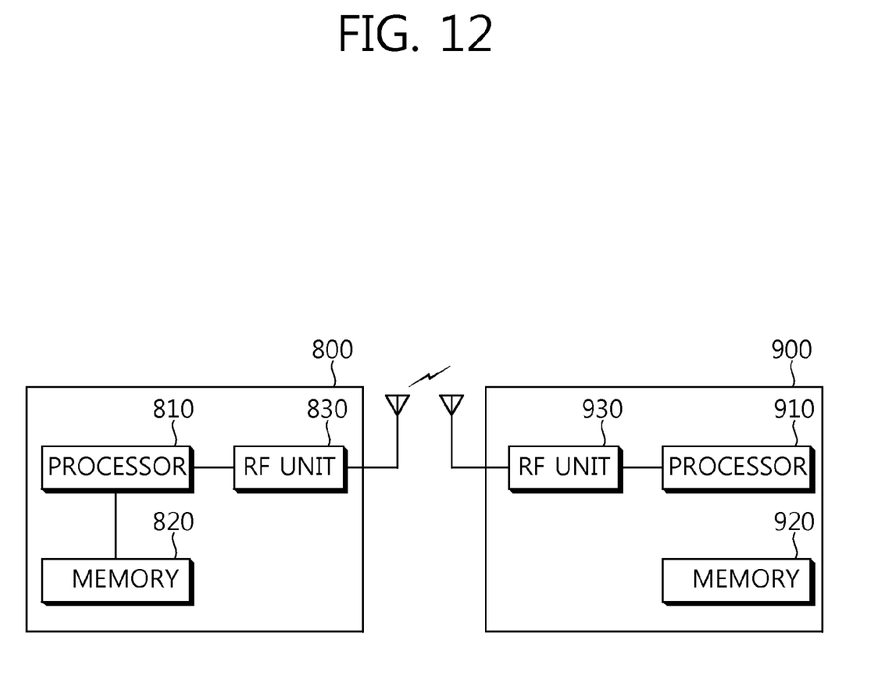
FIG. 12 is a block diagram illustrating a BS and an MS.

FIG. 12 is a block diagram illustrating a BS and an MS.

The BS 800 includes a processor 810, memory 820, and a Radio Frequency (RF) unit 830. The processor 810 embodies the proposed functions, processes, and/or methods. That is, the processor 810 transmits information on a method of transmitting feedback information to an MS. That is, the processor 810 may inform the MS of information on antennas, that is, the subject of feedback information, information on what feedback information will be transmitted, and information regarding that the feedback information will be transmitted in what period.

The MS 900 includes a processor 910, memory 920, and an RF unit 930. The processor 910 transmits first feedback information indicative of a channel state a with at least one of a plurality of antennas to a BS. Here, the processor 910 may transmit second feedback information indicative of the at least one antenna to the BS.

The memory 920 is connected to the processor 910, and it stores various pieces of information for driving the processor 910. The RF unit 930 is connected to the processor 910, and it transmits and/or receives radio signals.

The processor 810, 910 may include Application-Specific Integrated Circuits (ASICs), other chipsets, logic circuits, or data processors or all of them. The memory 820, 920 may include Read-Only Memory (ROM), Random Access Memory (RAM), flash memory, memory cards, storage media and/or other storage devices. The RF unit 830, 930 may include a baseband circuit for processing a radio signal. When the above-described embodiment is embodied in software, the above-described scheme may be embodied using a module (process or function) that performs the above function. The module may be stored in the memory 820, 920 and executed by the processor 810, 910. The memory 820, 920 may be placed inside or outside the processor 810, 910 and connected to the processor 810, 910 using a variety of well-known means.

The present invention may be embodied using hardware, software, or a combination of them. In hardware implementations, the present invention may be embodied using Application Specific Integrated Circuits (ASICs), Digital Signal Processors (DSPs), Programmable Logic Devices (PLDs), Field Programmable Gate Arrays (FPGAs), processors, controllers, microprocessors, other electronic units, or a combination of them, which are designed to perform the above function. In software implementations, the present invention may be embodied using a module performing the above function. The software may be stored in the memory and executed by the processor. The memory or the processor may adopt various means well known to those skilled in the art.

Although the preferred embodiments of the present invention have been described in detail, a person having ordinary skill in the art will appreciate that the present invention may be modified in various ways without departing from the spirit and scope of the present invention defined in the appended claims. Accordingly, a change of future embodiments of the present invention may not deviate from the technology of the present invention.

The invention claimed is:

1. A method of a mobile station transmitting feedback information in a multi-node system in which a plurality of antennas is distributed over and disposed in a cell and a base station for controlling the plurality of antennas is included, the method comprising the steps of:
   transmitting, by the mobile station, first feedback information and second feedback information to the base station, wherein the first feedback information and the second feedback information indicates a state for a channel, through at least one of the plurality of antennas; and
   transmitting, by the mobile station, third feedback information to the base station, wherein the third feedback information indicates a state of the at least one of the plurality of antennas,
   wherein the second feedback information comprises at least one of a subband index value indicating a subband selected from a plurality of subbands allocated to the mobile station and information on a rank preferred by the mobile station in relation to the selected subband,
   wherein the first feedback information comprises at least one of Channel Quality Information (CQI) on the selected subband, and a Precoding Matrix index (PMI) for the selected subband,
   wherein the third feedback information comprises at least one of information on a number of the at least one antenna and antenna classification information on which the at least one antenna can be identified,
   wherein the first feedback information is periodically transmitted according to a first assigned time interval, the second feedback information is periodically transmitted according to a second assigned time interval, and the third feedback information is periodically transmitted according to a third assigned time interval, and
   wherein the second assigned time interval has a longer time period than the first assigned time interval, and the third assigned time interval has a longer time period than the second assigned time interval.

2. The method of claim 1, further comprising the step of the mobile station receiving, from the base station, classification information on an antenna on which the first feedback information is to be transmitted.

3. The method of claim 1, wherein each of the plurality of antennas transmits a predetermined reference signal, and the mobile station measures the reference signals and distinguishes the plurality of antennas from one another based on a result of the measurement.

4. The method of claim 1, wherein each of the plurality of antennas transmits unique identification information, and the mobile station distinguishes the plurality of antennas from one another through the unique identification information.

5. An apparatus for transmitting feedback information which operates in a multi-node system in which a plurality of antennas is distributed over and disposed in a cell and a base station for controlling the plurality of antennas is included, the apparatus comprising:
   a Radio Frequency (RF) unit configured to transmit and receive radio signals; and
   a processor connected to the RF unit,
      wherein the processor transmits first feedback information and second feedback information to the base station, wherein the first feedback information and the second feedback information indicates a state for a channel, through at least one of the plurality of antennas, and
      wherein the processor further transmits third feedback information to the base station, wherein the third feedback information indicates a state of the at least one of the plurality of antennas,
      wherein the second feedback information comprises at least one of a subband index value indicating a subband selected from a plurality of subbands allocated to the mobile station and information on a rank preferred by the mobile station in relation to the selected subband,
      wherein the first feedback information comprises at least one of Channel Quality Information (CQI) on the selected subband, and a Precoding Matrix index (PMI) for the selected subband,
      wherein the third feedback information comprises at least one of information on a number of the at least one antenna and antenna classification information on which the at least one antenna can be identified,
      wherein the first feedback information is periodically transmitted according to a first assigned time interval, the second feedback information is periodically transmitted according to a second assigned time interval, and the third feedback information is periodically transmitted according to a third assigned time interval, and
      wherein the second assigned time interval has a longer time period than the first assigned time interval, and the third assigned time interval has a longer time period than the second assigned time interval.

* * * * *